(12) United States Patent
Cheon et al.

(10) Patent No.: US 8,327,210 B2
(45) Date of Patent: Dec. 4, 2012

(54) METHOD FOR PROVIDING MULTICAST SERVICE IN A WIRELESS COMMUNICATION SYSTEM AND SYSTEM THEREOF

(75) Inventors: Jung-Hoon Cheon, Suwon-si (KR); Jong-Hyung Kwun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1062 days.

(21) Appl. No.: 12/291,312

(22) Filed: Nov. 7, 2008

(65) Prior Publication Data

US 2009/0125776 A1 May 14, 2009

(30) Foreign Application Priority Data

Nov. 8, 2007 (KR) .................. 10-2007-0113872

(51) Int. Cl.
*G06F 11/00* (2006.01)
(52) U.S. Cl. ...................... 714/748; 714/749

(58) Field of Classification Search ............... None
See application file for complete search history.

(56) References Cited

U.S. PATENT DOCUMENTS

| | | | | |
|---|---|---|---|---|
| 6,996,104 | B2* | 2/2006 | Trossen et al. | 370/390 |
| 7,715,311 | B2* | 5/2010 | Herrmann | 370/227 |
| 2006/0153227 | A1* | 7/2006 | Hwang et al. | 370/465 |
| 2009/0073916 | A1* | 3/2009 | Zhang et al. | 370/315 |
| 2011/0199996 | A1* | 8/2011 | Zhang et al. | 370/329 |

* cited by examiner

*Primary Examiner* — Christopher McCarthy

(57) ABSTRACT

A method is provided for providing a multicast service by a base station (BS) in a wireless communication system. The method includes transmitting an $N^{th}$ data traffic corresponding to a multicast service to a plurality of mobile stations (MSs) through a multicast channel in an $F^{th}$ frame; determining whether a Negative Acknowledgement (NACK) message indicating a failure to receive the $N^{th}$ data traffic is received from at least one MS in an $(F+1)^{th}$ frame; and when the NACK message is received, retransmitting the $N^{th}$ data traffic to an MS, which transmitted the NACK message, through an other channel different from the multicast channel in an $(F+2)^{th}$ frame.

12 Claims, 4 Drawing Sheets

METHOD FOR PROVIDING MULTICAST SERVICE IN A WIRELESS COMMUNICATION SYSTEM AND SYSTEM THEREOF

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Nov. 8, 2007 and assigned Serial No. 2007-113872, the disclosures of which are incorporated herein by reference.

TECHNICAL FIELD OF THE INVENTION

The present invention relates generally to a wireless communication system and, in particular, to a method for providing multicast services by a base station (BS) in a wireless communication system, and a system thereof.

BACKGROUND OF THE INVENTION

In general, a broadcast service refers to a service in which a transmitter transmits control messages and data traffic to a plurality of unspecified receivers. The transmitter can be a base station (BS), and the receiver can be a mobile station (MS). The BS provides broadcast services using a modulation and coding scheme (MCS) level at which the MSs located in the cell boundary can receive signals. Therefore, even when the channel state is good as all MSs being subject to broadcast service are located in the vicinity of the BS as shown in FIG. 1, the BS transmits signals by applying the lowest MCS level at which the signals can arrive at up to the cell boundary. The signals transmitted using the lowest MCS level are robust against the channel condition but inefficient in terms of resource utilization.

On the other hand, a multicast service refers to a service in which a BS transmits control messages and data traffic to a plurality of specified MSs. At present, 3rd Generation Partnership Project (3GPP) and 3GPP2 define Multimedia Broadcast Multicast Service (MBMS) and Broadcast Multicast Service (BCMCS) as their multicast services, respectively.

However, MBMS and BCMCS have not defined any scheme in which the BS can determine whether the MS has normally received multicast data traffic. Therefore, there is no defined scheme in which the BS can retransmit the multicast data traffic when the MS that has failed to receive the multicast data traffic.

SUMMARY OF THE INVENTION

To address the above-discussed deficiencies of the prior art, it is a primary aspect of the present invention to address at least the problems and/or disadvantages and to provide at least the advantages described below. Accordingly, an aspect of the present invention is to provide a method for efficiently retransmitting multicast data traffic by a BS in a wireless communication system, and a system thereof.

According to one aspect of the present invention, there is provided a method for providing a multicast service by a base station (BS) in a wireless communication system. The method includes transmitting an $N^{th}$ data traffic corresponding to a multicast service to a plurality of mobile stations (MSs) through a multicast channel in an $F^{th}$ frame; determining whether a Negative Acknowledgement (NACK) message indicating a failure to receive the $N^{th}$ data traffic is received from at least one MS in an $(F+1)^{th}$ frame; and when the NACK message is received, retransmitting the $N^{th}$ data traffic to an MS, which transmitted the NACK message, through an other channel different from the multicast channel in an $(F+2)^{th}$ frame.

According to another aspect of the present invention, there is provided a method for receiving a multicast service by a mobile station (MS) in a wireless communication system. The method includes receiving an $N^{th}$ data traffic corresponding to a multicast service from a base station (BS) through a multicast channel in an $F^{th}$ frame; when decoding of the $N^{th}$ data traffic has failed, sending a Negative Acknowledgement (NACK) message indicating a failure to receive the $N^{th}$ data traffic to the BS in an $(F+1)^{th}$ frame; and re-receiving the $N^{th}$ data traffic from the BS in an $(F+2)^{th}$ frame through an other channel different from the multicast channel.

According to further another aspect of the present invention, there is provided a wireless communication system including a base station (BS) and a plurality of mobile stations (MSs). The wireless communication system includes the BS for transmitting an $N^{th}$ data traffic corresponding to a multicast service to the plurality of MSs through a multicast channel in an $F^{th}$ frame, determining whether a Negative Acknowledgement (NACK) message indicating a failure to receive the $N^{th}$ data traffic is received from at least one MS in an $(F+1)^{th}$ frame, and when the NACK message is received, retransmitting the $N^{th}$ data traffic to an MS, which transmitted the NACK message, through an other channel different from the multicast channel in an $(F+2)^{th}$ frame; and the MS for determining whether an $N^{th}$ data traffic corresponding to the multicast service is received from the BS through the multicast channel in the $F^{th}$ frame, sending a NACK message indicating a failure to receive the $N^{th}$ data traffic to the BS in the $(F+1)^{th}$ frame when the reception is failed, and re-receiving the $N^{th}$ data traffic from the BS in the $(F+2)^{th}$ frame.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
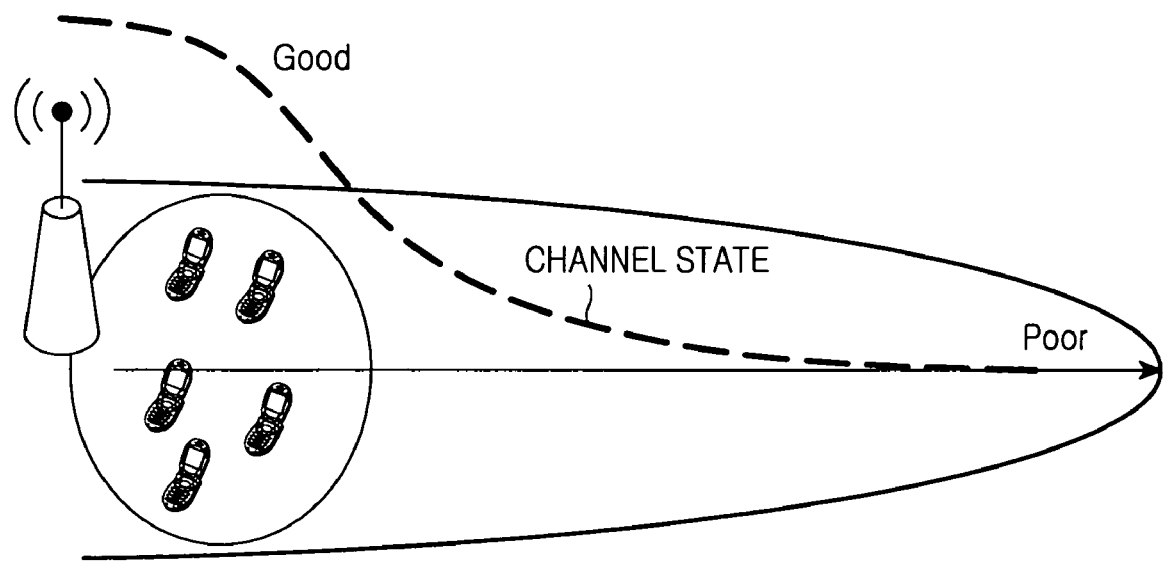
FIG. 1 is a diagram illustrating a channel state of MSs located in the vicinity of a BS in a wireless communication system.
Figure 2:
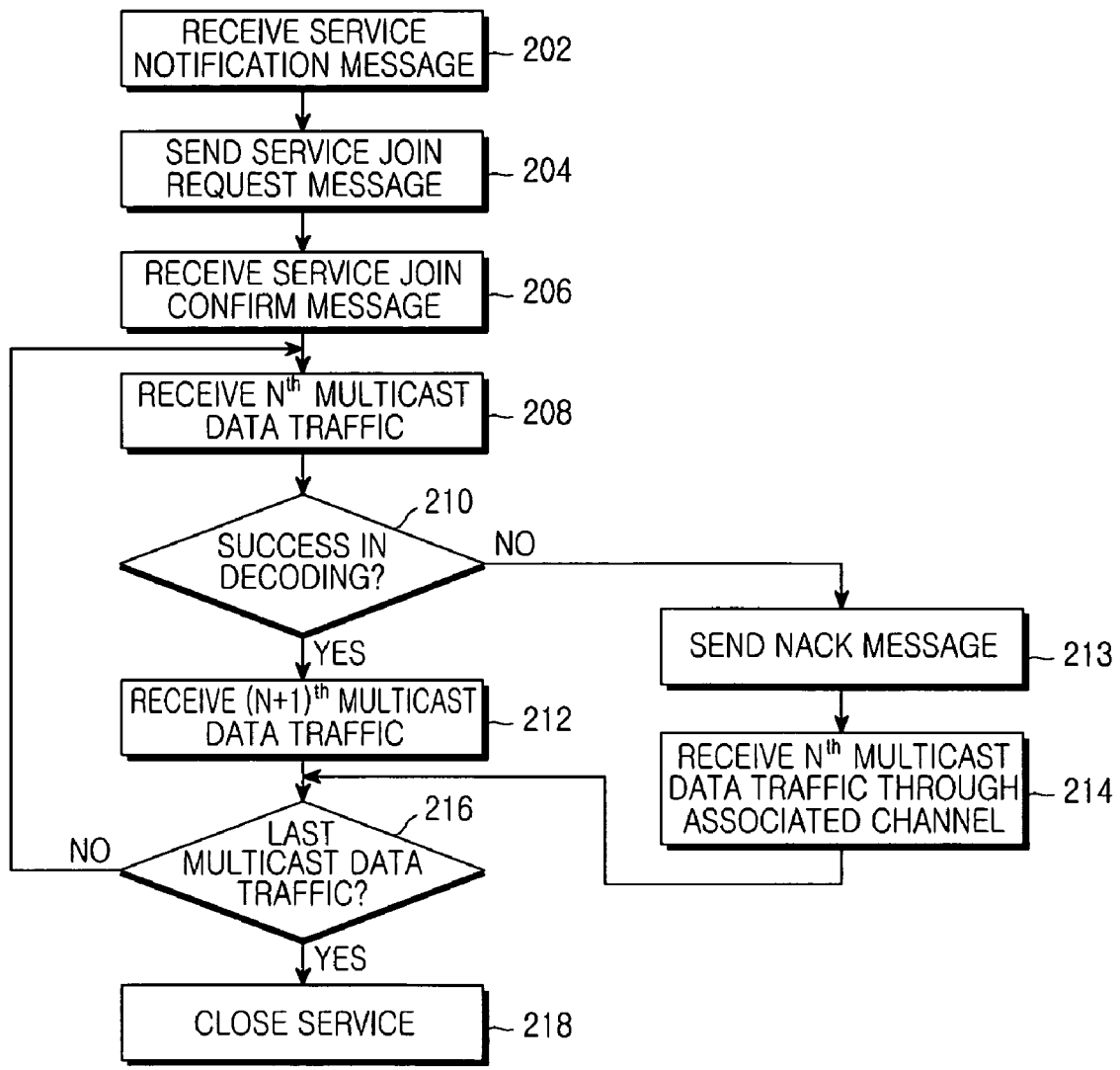
FIG. 2 is a flowchart illustrating a multicast data traffic reception/re-reception process of an MS according to an embodiment of the present invention.
Figure 3:
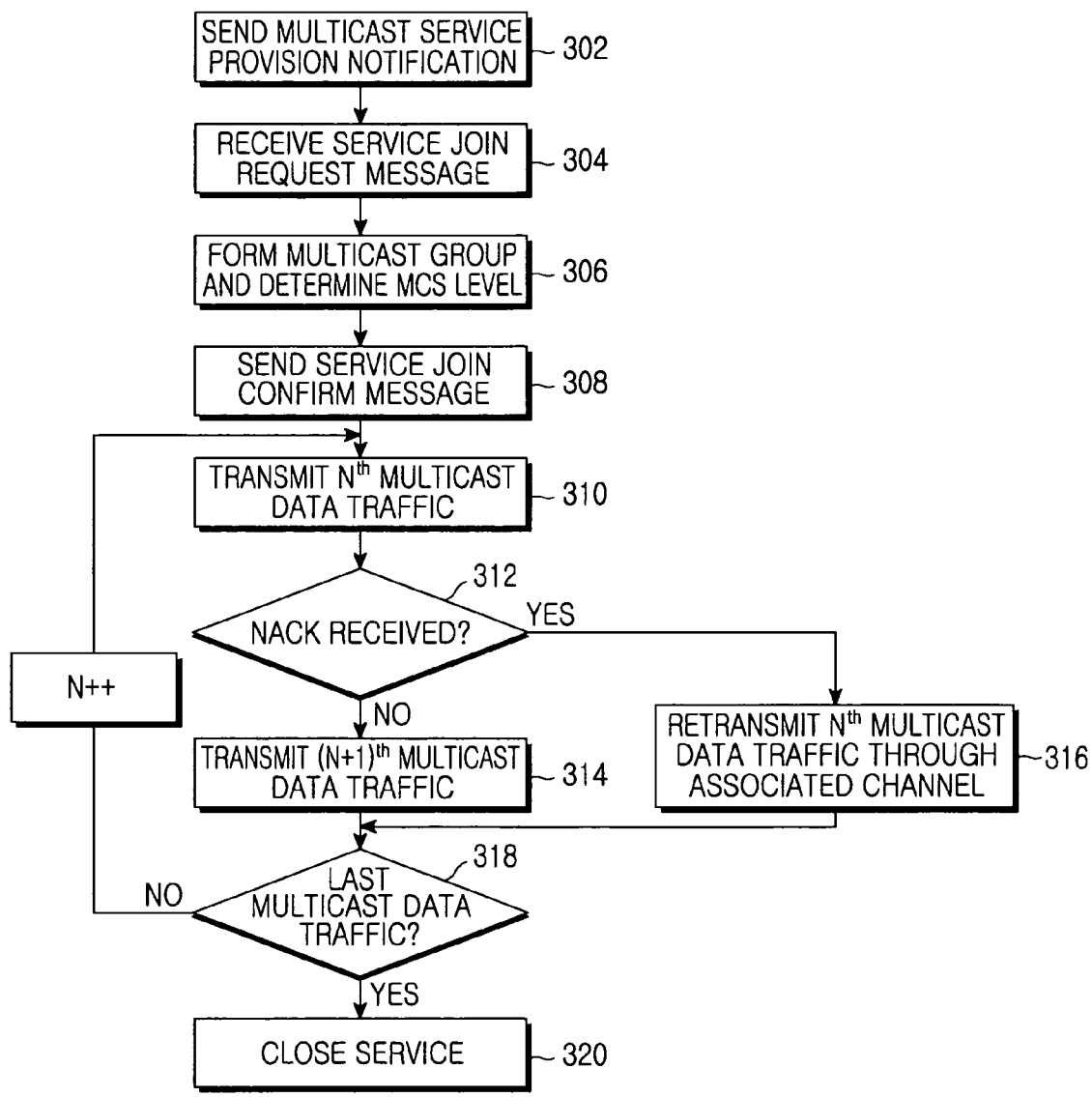
FIG. 3 is a flowchart illustrating a multicast data traffic transmission/retransmission process of a BS according to an embodiment of the present invention.
Figure 4:
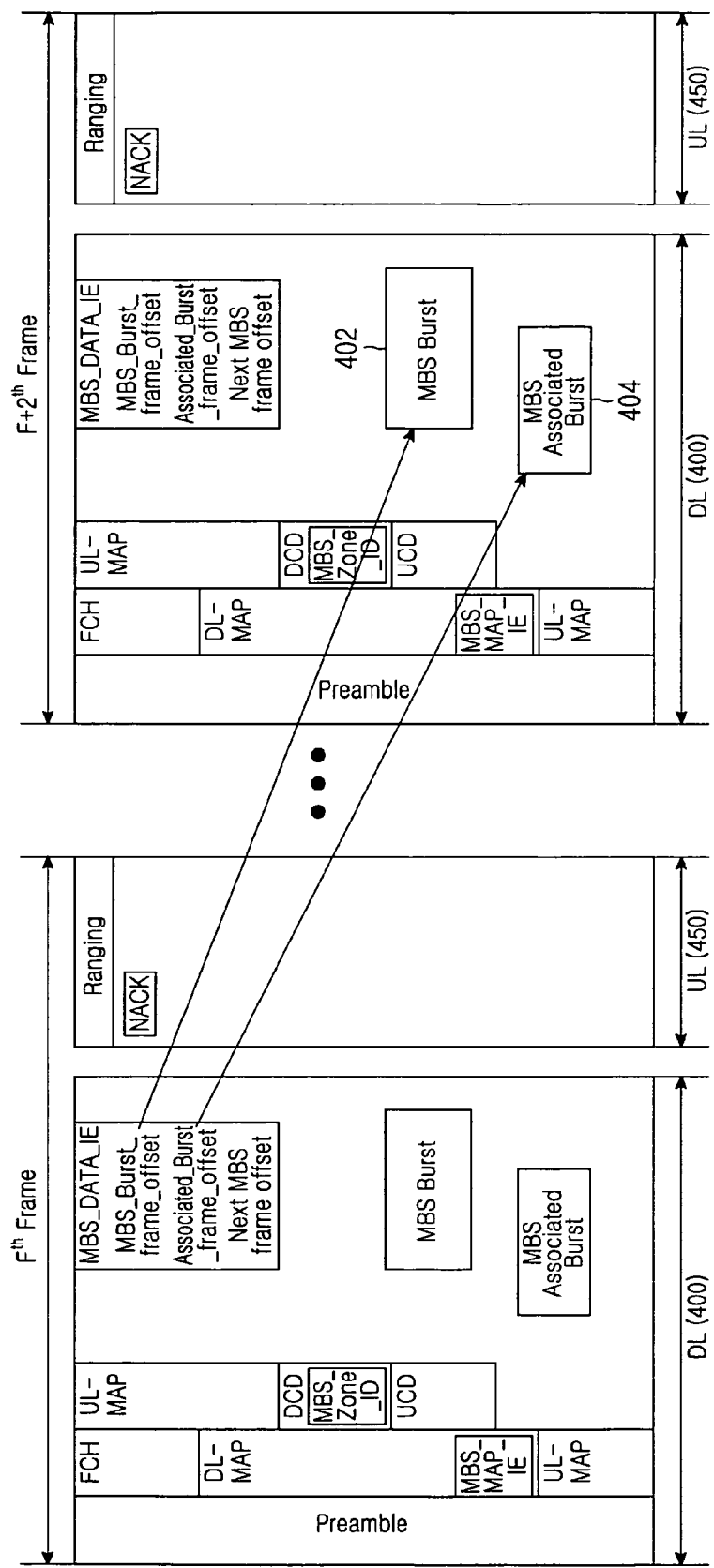
FIG. 4 is a diagram illustrating a frame structure through which transmission/retransmission of multicast data traffic is achieved according to an embodiment of the present invention.

FIGS. 2 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a method in which a base station (BS) receives a response to its transmitted multicast data traffic from a mobile station (MS), and when the MS has failed to receive the multicast data traffic, the BS retransmits the multicast data traffic to the MS using different channel resources in a wireless communication system, and a system thereof. The channel through which the BS retransmits multicast data traffic only to the MS that has failed to receive the multicast data traffic, will be referred to herein as an 'associated channel'.

The following assumptions are required to achieve (i) an operation of transmitting multicast data traffic by a BS, (ii) an operation of sending by an MS a response to the BS according to whether or not it has received the multicast data traffic, and (iii) an operation of retransmitting the multicast data traffic by the BS when the MS has failed to receive the multicast data traffic.

1. An MS located in the cell, when it perceives that it will receive a multicast service provided from a BS, sends to the BS a multicast service subscription request message, or service join request message, included its downlink Channel Quality Information (CQI).

2. When the BS receives the service join request message with CQI from the MS, the BS considers that the corresponding MS joins the multicast service.

3. An MS, which has failed to receive multicast data traffic, sends a Negative Acknowledgement (NACK) to the BS, and knows that the multicast data traffic are retransmitted from the BS through an associated channel.

When the retransmission technology used in the conventional unicast service is applied intact for the multicast service, the BS transmits multicast data traffic to MSs, and allows the MSs, which have failed to receive the multicast data traffic, to send a NACK signal. Upon receipt of the NACK signal, the BS retransmits the multicast data traffic to all MSs which are subject to multicast service.

In the foregoing multicast data traffic retransmission scheme, due to the characteristics of the multicast service that simultaneously transmits multicast data traffic to a plurality of MSs, there is a high probability that as the number of MSs being subject to multicast service increases, at least one or more MSs cannot receive the multicast data traffic.

Therefore, if the conventional unicast service retransmission scheme is applied intact to the multicast service retransmission, scheduling priority is given to retransmission of the multicast data traffic, so even the MS that has succeeded in receiving the multicase data traffic may re-receive the multicast data traffic it successfully received before. In addition, the MS that has successfully received the multicast data traffic may duplicately receive the multicast data traffic, and the unnecessary duplicate reception of the multicast data traffic causes a waste of power. Therefore, the BS should selectively retransmit the multicast data traffic only to the MS, which has failed to receive the multicast data traffic, through a separate channel proposed by the present invention, and should transmit the next multicast data traffic to the other MSs that have succeeded in receiving the multicast data traffic.

FIG. 2 is a flowchart illustrating a multicast data traffic reception/re-reception process of an MS according to an embodiment of the present invention.

Referring to FIG. 2, in step 202, the MS receives a multicast service provision notification message indicating that a BS will provide a multicast service. In step 204, the MS sends a service join request message to the BS to receive the multicast service and then proceeds to step 206. The service join request message includes downlink CQI between the MS and the BS.

In step 206, the MS receives a service join confirm message from the BS and then proceeds to step 208. The service join confirm message is a BS's response message to the service join request message. The service join confirm message includes information such as a modulation and coding scheme (MCS) level used when the BS provides the multicast service, a retransmission scheme for multicast data traffic, and a response scheme. The response scheme, as used herein, refers to a scheme in which an MS sends a NACK to the BS when it has failed to normally receive multicast data traffic. In the present invention, the retransmission scheme can retransmit the multicast data traffic even through a multicast-dedicated control channel (for example, Multicast Broadcast Control Channel (MCBCCCH)) at the time of the multicast service. Through the multicast-dedicated channel, the MS can acquire information indicating whether retransmission of multicast data traffic through the associated channel newly proposed by the present invention is supported.

In step 208, the MS receives an $N^{th}$ multicast data traffic in an $F^{th}$ frame. In step 210, the MS performs decoding on the $N^{th}$ multicast data traffic. The MS proceeds to step 212 upon success in decoding the $N^{th}$ multicast data traffic, and proceeds to step 214 upon failure in the decoding. In step 212, the MS receives an $(N+1)^{th}$ multicast data traffic in an $(F+2)^{th}$ frame, and then proceeds to step 216. However, in step 213, the MS sends a NACK message to the BS in an $(F+1)^{th}$ frame. In step 214, the MS re-receives the $N^{th}$ multicast data traffic through an associated channel in the $(F+2)^{th}$ frame. Of course, the MS can receive even the $(N+1)^{th}$ multicast data traffic in the $(F+2)^{th}$ frame.

On assumption that the MS normally decodes the $(N+1)^{th}$ multicast data traffic and the $N^{th}$ multicast data traffic it has received in steps 212 and 214, respectively, the MS determines in step 216 whether the $(N+1)^{th}$ multicast data traffic is the last multicast data traffic. If the $(N+1)^{th}$ multicast data traffic is the last multicast data traffic, the MS closes the service to stop receiving the multicast service from the BS in step 218.

FIG. 3 is a flowchart illustrating a multicast data traffic transmission/retransmission process of a BS according to an embodiment of the present invention.

Referring to FIG. 3, in step 302, the BS transmits the multicast service provision notification message indicating that a BS will provide a multicast service. In step 304, the BS receives a service join request message from the MSs. In step 306, the BS forms a multicast group(s) depending on the CQI of each MS included in the service join request message and determines an MCS level for each multicast group.

In step 308, the BS sends to the MSs a service join confirm message as a response message to the service join request message, and then proceeds to step 310. The service join confirm message includes the information the BS determined in step 306 (i.e., the information such as an identifier of a multicast group to which each MS belongs, CQI, and MCS level). In step 310, the BS transmits an $N^{th}$ multicast data traffic in an $F^{th}$ frame by applying the determined MCS level.

In step 312, the BS determines if it has received a NACK from at least one MS. If a NACK is not received from any MS, the BS transmits an $(N+1)^{th}$ multicast data traffic in an $(F+2)^{th}$ frame in step 314, and then proceeds to step 318. However, if a NACK is received from particular MS, the BS retransmits the $N^{th}$ multicast data traffic through an associated channel in an $(F+2)^{th}$ frame only to the particular MS in step 316, and then proceeds to step 318. The BS determines in step 318 whether the $(N+1)^{th}$ multicast data traffic is the last multicast data traffic. If the $(N+1)^{th}$ multicast data traffic is the last multicast data traffic, the BS proceeds to step 320 where it closes the multicast service. However, if the $(N+1)^{th}$ multicast data traffic is not the last multicast data traffic, the BS increases N by 1 (N++), and then re-performs step 310 and its succeeding steps. The number of retransmissions for multicast data traffic by the BS can be predetermined.

FIG. 4 is a diagram illustrating a frame structure through which transmission/retransmission of multicast data traffic is achieved according to an embodiment of the present invention.

Referring to FIG. 4, the frame is divided into a downlink subframe (DL) 400 and an uplink subframe (UL) 450. The downlink subframe 400 is composed of a preamble region, a region including control information, and a downlink data burst region, and uplink subframe 450 is composed of an uplink data burst region. The region including control information includes a Frame Control Header (FCH) region, a DL-MAP region, a UL-MAP region, a Downlink Channel Description (DCD) region, and an Uplink Channel Description (UCD) region.

The DL-MAP region includes a Multimedia Broadcasting System MAP Information Element (MBS_MAP_IE). The MBS_MAP_IE indicates an MBS_DATA_IE indicating a frame including MBS data (i.e., multicast data traffic) and also indicating position and size of the multicast data traffic. In the following description, the terms 'MBS data', 'MBS burst', and 'multicast data traffic' are all assumed to have the same meaning.

The MBS_DATA_IE includes MBS_Burst_frame_offset indicating a position of an MBS burst, Next_MBS_frame_offset indicating the next MBS frame, and Associated_Burst_frame_offset, proposed by the present invention, indicating a position of an MBS burst subject to retransmission. Generally, an MBS burst 402 exists in an MBS_Burst_frame_offset+2 frame and/or its succeeding frames. Similarly, even in the present invention, an MBS burst 404 that the BS retransmits can exist in an Associated_Burst_frame_offset+2 frame and/or its succeeding frames.

As is apparent from the foregoing description, according to the present invention, the BS can retransmit multicast data traffic through a separate channel for the MS that has failed to receive the multicast data traffic in the wireless communication system, thereby contributing to an increase in service reliability. In addition, the BS can retransmit the multicast data traffic only to the MS that has failed to receive the multicast data traffic, thereby contributing to a decrease in waste of wireless resources.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a multicast service by a base station (BS) in a wireless communication system, the method comprising:
   transmitting an $N^{th}$ data traffic corresponding to a multicast service to a plurality of mobile stations (MSs) through a multicast channel in an $F^{th}$ frame;
   determining whether a Negative Acknowledgement (NACK) message indicating a failure to receive the $N^{th}$ data traffic is received from at least one mobile station (MS) in an $(F+1)^{th}$ frame; and
   in response to receiving the NACK message, retransmitting the $N^{th}$ data traffic to the at least one MS through another channel different from the multicast channel in an $(F+2)^{th}$ frame,
   wherein a frame where the $N^{th}$ data traffic is retransmitted, and a position where the retransmitted $N^{th}$ data traffic is situated in a data burst region of a frame are indicated in the $F^{th}$ frame.

2. The method of claim 1, further comprising:
   transmitting an $(N+1)^{th}$ data traffic to a MS, which transmitted no NACK message, in the $(F+2)^{th}$ frame.

3. The method of claim 1, further comprising:
   receiving, from the plurality of MS, a multicast service join request message including therein a downlink channel quality information (CQI);
   dividing the plurality of MS into at least one multicast service group depending on the downlink channel quality information in response to the received multicast service join request message;
   determining a modulation and coding scheme (MCS) level for each multicast group;
   applying an MCS level of the $N^{th}$ data traffic according to the determined MCS level; and
   sending a service join confirm message including therein at least one of the determined MCS level, a retransmission scheme for the multicast data traffic, and a response scheme.

4. A method for receiving a multicast service by a mobile station (MS) in a wireless communication system, the method comprising:
   receiving an $N^{th}$ data traffic corresponding to a multicast service from a base station (BS) through a multicast channel in an $F^{th}$ frame;
   when a decoding of the $N^{th}$ data traffic fails, sending a Negative Acknowledgement (NACK) message indicating a failure to receive the $N^{th}$ data traffic to the BS in an $(F+1)^{th}$ frame; and
   re-receiving the $N^{th}$ data traffic from the BS in an $(F+2)^{th}$ frame through another channel different from the multicast channel,
   wherein a frame where the $N^{th}$ data traffic is retransmitted, and a position where the retransmitted $N^{th}$ data traffic is situated in a data burst region of a frame are indicated in the $F^{th}$ frame.

5. The method of claim 4, further comprising:
   sending a multicast service join request message including a downlink Channel Quality Information (CQI) to the BS; and
   receiving, from the BS, a service join confirm message as a response message to the multicast service join request message.

6. The method of claim 5, wherein the service join confirm message includes at least one of a modulation and coding scheme (MCS) level applied to the multicast data traffic, a retransmission scheme for the multicast data traffic, and a response scheme.

7. An apparatus in a Base Station (BS), the apparatus configured to provide a multicast service in a wireless communication system, the apparatus comprising:
- a transmitter configured to transmit an $N^{th}$ data traffic corresponding to a multicast service to a plurality of mobile stations (MSs) through a multicast channel in an $F^{th}$ frame, and retransmit the $N^{th}$ data traffic to the at least one mobile station (MS) through another channel different from the multicast channel in an $(F+2)^{th}$ frame when the NACK message is received; and
- a controller configured to determine whether a Negative Acknowledgement (NACK) message indicating a failure to receive the $N^{th}$ data traffic is received from at least one MS in an $(F+1)^{th}$ frame,
- wherein a frame where the $N^{th}$ data traffic is retransmitted, and a position where the retransmitted $N^{th}$ data traffic is situated in a data burst region in a frame are indicated in the $F^{th}$ frame.

8. The apparatus of claim 7, wherein the transmitter is configured to transmit an $(N+1)^{th}$ data traffic to a MS, which transmitted no NACK message, in the $(F+2)^{th}$ frame.

9. The apparatus of claim 7, further comprising:
- a receiver configured to receive a multicast service join request message including therein a downlink channel quality information (CQI) from the plurality of MSs,
- wherein the controller is configured to divide the plurality of MSs into at least one multicast service group depending on the downlink channel quality information in response to the received multicast service join request message, determine a modulation and coding scheme (MCS) level for each multicast group, and apply an MCS level of the $N^{th}$ data traffic according to the determined MCS level, and
- wherein the transmitter is configured to transmit a service join confirm message including therein at least one of the determined MCS level, a retransmission scheme for the multicast data traffic, and a response scheme.

10. An apparatus in a mobile station (MS), the apparatus configured to receive a multicast service in a wireless communication system, the apparatus comprising:
- a receiver configured to receive an $N^{th}$ data traffic corresponding to a multicast service from a base station (BS) through a multicast channel in an $F^{th}$ frame, re-receive the $N^{th}$ data traffic from the BS in an $(F+2)^{th}$ frame through another channel different from the multicast channel; and
- a transmitter configured to transmit a Negative Acknowledgement (NACK) message indicating a failure to receive the $N^{th}$ data traffic to the BS in an $(F+1)^{th}$ frame when a decoding of the $N^{th}$ data traffic fails,
- wherein a frame where the $N^{th}$ data traffic is retransmitted, and a position where the retransmitted $N^{th}$ data traffic is situated in a data burst region in a frame are indicated in the $F^{th}$ frame.

11. The apparatus of claim 10, wherein the transmitter is configured to transmit a multicast service join request message including a downlink Channel Quality Information (CQI) to the base station, and the receiver receives a service join confirm message as a response message to the multicast service join request message from the base station.

12. The apparatus of claim 11, wherein the service join confirm message includes at least one of a modulation and coding scheme (MCS) level applied to the multicast data traffic, a retransmission scheme for the multicast data traffic, and a response scheme.

* * * * *